(12) United States Patent
Gavette

(10) Patent No.: US 6,321,095 B1
(45) Date of Patent: Nov. 20, 2001

(54) WIRELESS COMMUNICATIONS APPROACH

(75) Inventor: Sherman Gavette, 1425 Timber Valley Rd., Colorado Springs, CO (US) 80919

(73) Assignee: Sherman Gavette, Camas, WA (US)

( * ) Notice: Subject to any disclaimer, the term of this patent is extended or adjusted under 35 U.S.C. 154(b) by 0 days.

(21) Appl. No.: 09/277,478

(22) Filed: Mar. 26, 1999

(51) Int. Cl.$^7$ ................................................ H04Q 7/20
(52) U.S. Cl. ........................ 455/517; 455/410; 455/411
(58) Field of Search ........................... 455/410, 411, 455/416, 426, 450, 462–465, 62, 509, 515–519, 575; 370/478, 329, 276, 347, 341, 344, 319, 321; 380/270, 273, 255, 259, 261, 247

(56) References Cited

U.S. PATENT DOCUMENTS

| | | | |
|---|---|---|---|
| 5,515,366 | * 5/1996 | Chieu et al. | 370/347 |
| 5,706,284 | 1/1998 | Lee . | |
| 5,737,325 | * 4/1998 | Fukuda | 370/337 |
| 5,771,463 | * 6/1998 | Lehmusto et al. | 455/524 |
| 6,018,780 | * 1/2000 | Fenchel | 710/105 |
| 6,081,601 | * 6/2000 | Raivisto | 380/270 |
| 6,111,909 | * 8/2000 | Taki | 375/132 |
| 6,122,759 | * 9/2000 | Ayanoglu et al. | 714/57 |
| 6,134,227 | * 10/2000 | Magana | 370/330 |

FOREIGN PATENT DOCUMENTS

| | | | |
|---|---|---|---|
| 0535863A2 | 4/1993 | (EP) | H04L/9/08 |
| 0713345A2 | 5/1996 | (EP) | H04Q/7/38 |

\* cited by examiner

*Primary Examiner*—Dwayne Bost
*Assistant Examiner*—Jean A Gelin
(74) *Attorney, Agent, or Firm*—Hickman Palermo Truong & Becker LLP; Edward A. Becker

(57) ABSTRACT

An approach for providing communications between mobile stations involves establishing a direct, digital communication link between mobile stations. A first mobile station determines a portion of a radio frequency (RF) band to carry communications between the first mobile station and a second mobile station. The first mobile station sends a request signal on the portion of the RF band to the second mobile station to request communications between the first mobile station and the second mobile station. The second mobile station transmits, in response to receiving the request signal, an acknowledge signal on the portion of the RF band directly to the first mobile station to acknowledge the request signal. The first mobile station establishes, in response to the acknowledge signal, a direct communications link between the first mobile station and the second mobile station.

8 Claims, 7 Drawing Sheets

WIRELESS COMMUNICATIONS APPROACH

FIELD OF THE INVENTION

The present invention relates to wireless communications, and more specifically, to an approach for providing direct, wireless communications between mobile stations.

BACKGROUND OF THE INVENTION

Wireless communication systems provide several important advantages over conventional telephone systems. First, wireless communication users can communicate in locations where conventional telephone service is not available, for example in remote or particularly rugged locations. Second, wireless communications users have much more mobility because they don't have to connect to a fixed network of telephone lines. These and other favorable characteristics make wireless communications ideally suited for search and rescue, law enforcement and a myriad of other uses, including everyday use. Two of the most common approaches for providing wireless communications are two-way radios and cellular telephone systems.

In their most simplistic form, two-way radios are portable frequency-modulated (FM) transceivers that allow users to both transmit and receive FM signals directly to and from other users. Two-way radios are relatively simple, are inexpensive to manufacture, are easily miniaturized and provide relatively robust performance and mobility over reasonable distances. Examples of two-way radios include citizen band (CB) radios and "walkie talkies" such as Motorola Corporation's TalkAbout® radios.

Despite the benefits of two-way radios, they have several drawbacks. First, two-way radios typically support only half-duplex operation, meaning that only one user can talk at a time. A user must push a "talk" button to talk to another user and if both users push their "talk" buttons at the same time, then the users cannot hear each other. The reason for this is that all participants transmit data on the same channel. Two-way radios also require that users agree upon and select a particular channel to use for a conversation. If the channel being used is lost or cannot be used because of excessive interference, then the users must transfer to a different channel which can be difficult to do unless an alternate channel has been previously agree upon. Another problem with two-way radios is that communications are generally not private. Anyone with a compatible radio can eavesdrop on a conversation simply by tuning their radio to the channel on which the conversation is being held. Finally, two-way radios do not provide the call services available with digital systems such as call waiting, caller identification and messaging.

Cellular telephone systems are based upon a network of base stations that provide a coverage area in which users can communicate. Users communicate indirectly with other users through the base stations. Digital cellular telephone systems generally provide superior voice quality and are more secure than analog cellular telephone systems and two-way radios. Furthermore, digital cellular telephone systems provide a wide variety of call services such as call waiting, call forwarding and voice mail, that are not available on analog cellular telephone systems and two-way radios.

Notwithstanding the advantages that digital cellular telephone systems provide over analog cellular telephone systems and two-way radios, they also have some drawbacks. One drawback is that users can only communicate within the coverage area of the cellular network. Cellular telephone system coverage is typically provided only in metropolitan areas and is not available in remote areas where it is less economically feasible to install the necessary infrastructure. Another problem with cellular telephone systems is that users must pay for "air time" to connect to public service telephone networks (PSTNs).

Based on the need for wireless communications and the limitations in the prior approaches, an approach for providing wireless communications that does not suffer from the limitations of the prior approaches is highly desirable.

SUMMARY OF THE INVENTION

According to one aspect of the invention, a method provides wireless communications between mobile stations. A first portion of a radio frequency (RF) band is selected to carry communications between the first mobile station and a second mobile station. A first request signal is transmitted on a first sub-portion of the first portion of the RF band directly to the second mobile station to request communications between the first mobile station and the second mobile station. In response to receiving the first request signal, a first acknowledge signal is transmitted on a second sub-portion of the first portion of the RF band directly to the first mobile station to acknowledge the first request signal. Finally, in response to receiving the first acknowledge signal from the second mobile station, a direct communication link is established between the first mobile station and the second mobile station on the first portion of the RF band.

According to another aspect of the invention, a method provides direct, wireless communications between mobile stations using a frequency division multiple access/time division multiple access communication protocol. First, a first mobile station selects a particular circuit from a plurality of circuits in a radio frequency (RF) band to carry communications between the first mobile station and a second mobile station, wherein the particular circuit comprises a plurality of slots. The first mobile station transmits a first request signal on a first slot from the plurality of slots directly to the second mobile station to request communications between the first mobile station and the second mobile station. The second mobile station transmits, in response to receiving the first request signal, a first acknowledge signal on a second slot from the plurality of slots directly to the first mobile station to acknowledge the first request signal. Finally, the first mobile station selects and assigns, in response to receiving the first acknowledge signal from the second mobile station, a slot (either the first slot or another slot) from the plurality of slots for carrying communication data from the first mobile station to the second mobile station, and a fourth slot from the plurality of slots for carrying communication data from the second mobile station to the first mobile station.

According to another aspect of the invention, a mobile station provides direct, wireless communications with another mobile station on a portion of a radio frequency (RF) band. The mobile station includes a transmitter configured to transmit communication signals on a first sub-portion of the portion of the RF band directly to another mobile station, a receiver configured to receive communication signals directly from the other mobile station on a second sub-portion of the RF band and processing logic configured to select the first sub-portion and the second sub-portion from a plurality of sub-portions of the portion of the RF band. The transmitter and receiver may transmit signals and receive signals, respectively, on any available portions of the RF band.

According to another aspect of the invention, a wireless communication system includes a first mobile station and a second mobile station. The first mobile station is configured to select a first available portion of a radio frequency (RF) band to carry communications between the first mobile station and the second mobile station, transmit a first request signal on a first sub-portion of the first portion of the RF band directly to the second mobile station to request communications between the first mobile station and the second mobile station, and establish, in response to receiving a first acknowledge signal from the second mobile station, a direct communication link between the first mobile station and the second mobile station on the first portion of the RF band. The second mobile station is configured to transmit, in response to receiving the first request signal from the first mobile station, a first acknowledge signal on a second sub-portion of the first portion of the RF band directly to the first mobile station to acknowledge the first request signal.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION OF THE INVENTION

In the following description, for the purposes of explanation, specific details are set forth in order to provide a thorough understanding of the invention. However, it will be apparent that the invention may be practiced without these specific details. In other instances, well-known structures and devices are depicted in block diagram form in order to avoid unnecessarily obscuring the invention.

Functional Overview

A novel approach for providing wireless communications between mobile stations involves establishing a direct, wireless, digital link between mobile stations that does not require any intermediary devices such as switches or base stations. The approach provides the free-roaming mobility of two-way radios and the performance, security and call services of digital cellular telephone systems, without requiring the physical infrastructure of digital cellular telephone systems.

Figure 1:
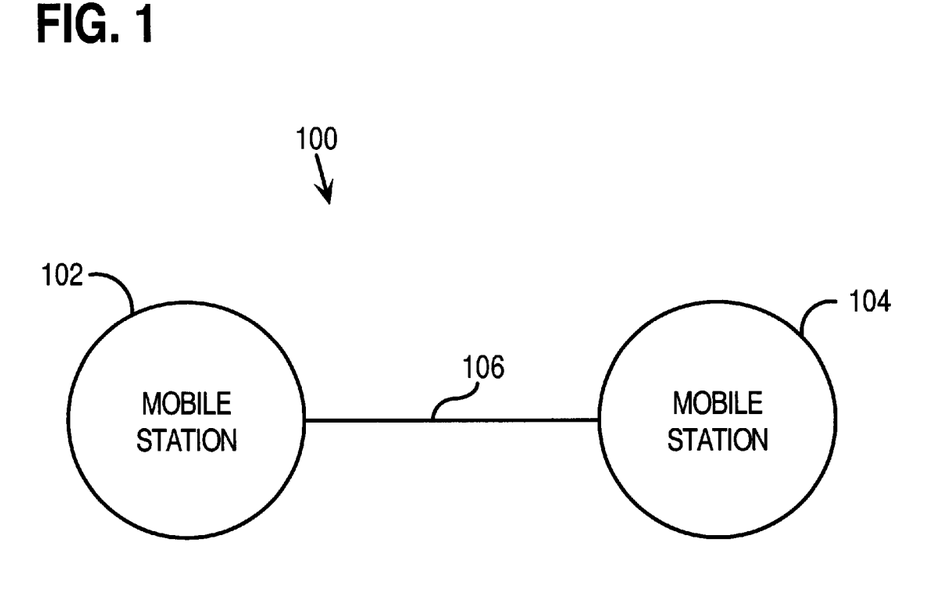
FIG. 1 is a block diagram illustrating an approach for providing wireless communications.

FIG. 1 is a block diagram 100 illustrating an approach for providing wireless communications between mobile stations using a direct, wireless, digital link, according to an embodiment. A first mobile station 102 is communicatively coupled to a second mobile station 104 via a direct, wireless, digital link 106. As used herein, the term "mobile station" refers to a mobile communication device, for example a handset. Thus, in FIG. 1, a first user communicates with other users through mobile station 102 and a second user communicates with other users through mobile station 104.

Detailed Description

The novel approach for providing wireless communications provides multiple, simultaneous communications between one or more groups of mobile stations. Accordingly, a multiple access communication protocol is employed to allow several mobile stations to share the radio frequency media. The invention is not limited to a particular multiple access methodology and may be implemented with many different types of multiple access communication protocols. Examples of suitable multiple access protocols include frequency division multiple access (FDMA), code division multiple access (CDMA) and time division multiple access (TDMA).

Figure 2:
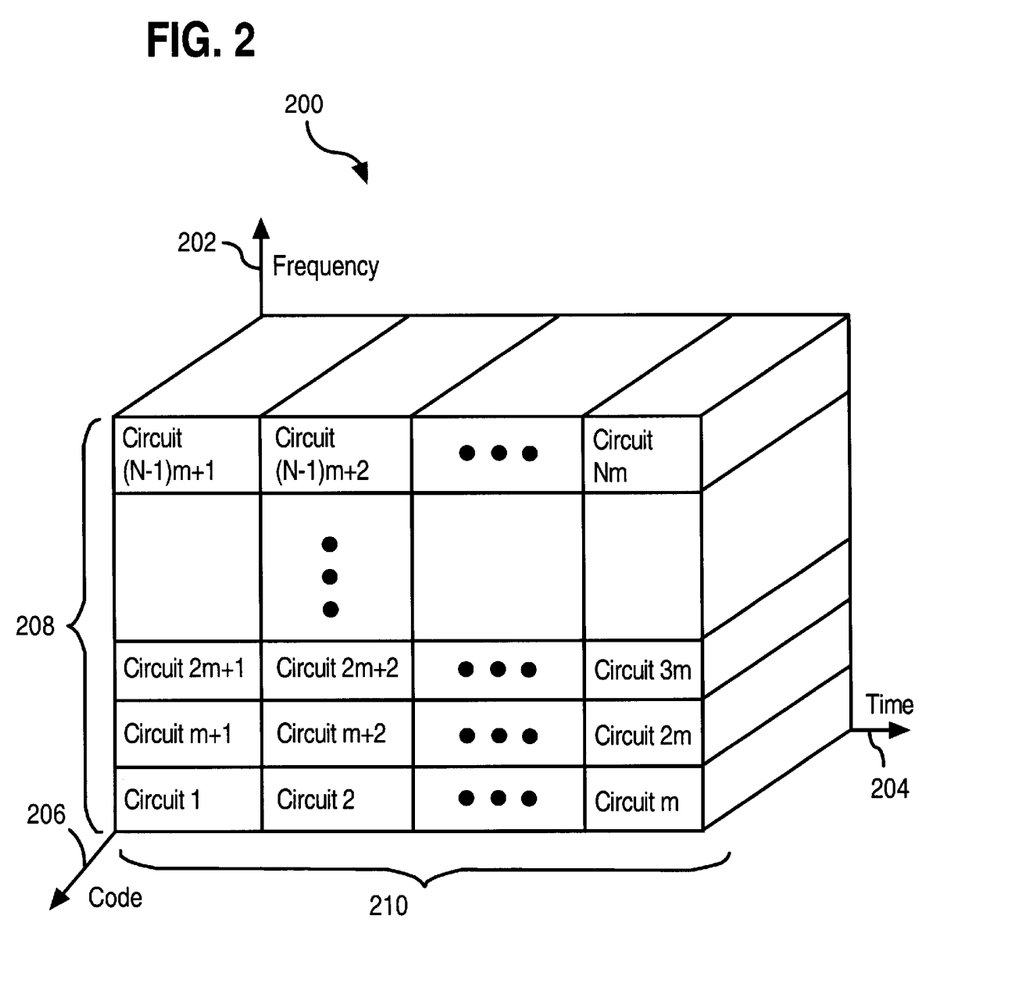
FIG. 2 is a block diagram illustrating a composite frequency division multiple access (FDMA)/time division multiple access (TDMA) communication protocol.

FIG. 2 is a block diagram that illustrates a composite FDMA/TDMA communication protocol for implementing the communication approach according to an embodiment. A composite FDMA/TDMA communication protocol is a multiple access communication protocol that has both FDMA and TDMA attributes. As illustrated in FIG. 2, a radio frequency band 200 is defined by a frequency axis 202, a time axis 204 and a code axis 206. According to the composite FDMA/TDMA communication protocol, radio frequency band 200 is divided by frequency into one or more logical portions 208 referred to herein as "conduits."

Conduits 208 are generally analogous to radio frequency channels. Conduits 208 are persistent over time and each conduit is capable of supporting several simultaneous communication sessions as described in more detail hereinafter. As used herein, the term "communication session" refers to an exchange of data between two or more participants over a specified period of time. Each conduit 208 carries data for each communication session being carried thereon, as well as signaling information for maintaining the communication session, as described in more detail hereinafter. For purposes of comparison, in a pure FDMA communication protocol, each conduit 208 is capable of supporting only a single communication session. Conduits 208 may be the same size or may vary in size, depending upon the requirements of a particular application.

Each conduit 208 is divided by time into two or more portions 210 referred to herein as "circuits" that are characterized by both frequency and time. A circuit is a portion of a conduit that is used to carry a single communication session. Circuits 210 may be contiguous or non-contiguous and may be the same size or may vary in size, depending upon the requirements of a particular application. For purposes of explanation only, conduits 208 are assumed to be contiguous and of equal size and circuits 210 are assumed to be contiguous and of equal size. In the present example, each conduit 208 is divided into (m) number of circuits 210. Therefore, for (N) number of conduits 208, there are a total of (Nm) circuits.

Figure 3:
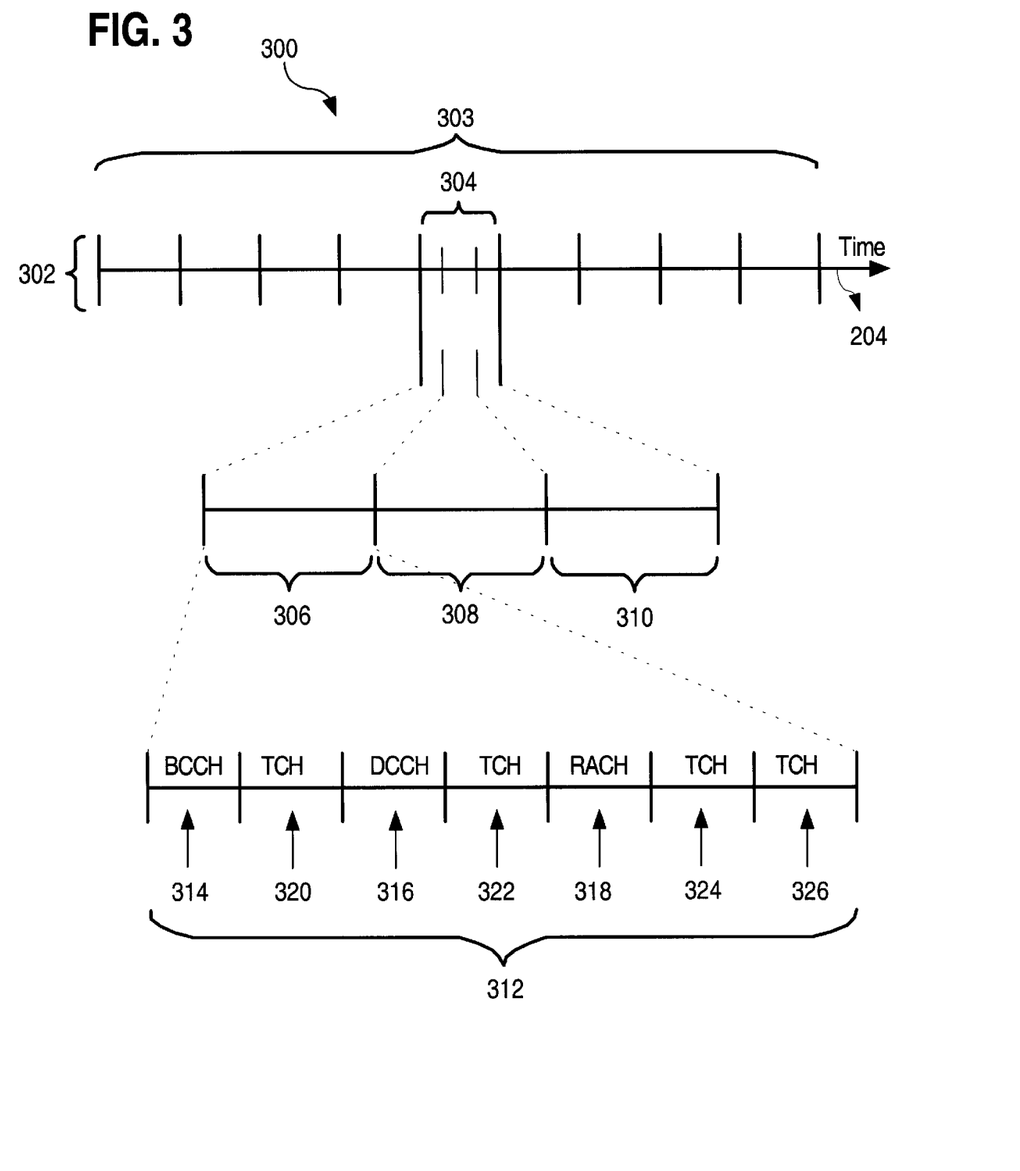
FIG. 3 is a block diagram illustrating an example frame structure used with the FDMA/TDMA communication protocol of FIG. 2.

FIG. 3 is a block diagram 300 that illustrates conduits 208 in more detail. A particular conduit 302 from conduits 208 is divided along the time axis into an infinite number of frames 303. Each frame 303 represents one sample period of the encoding/decoding mechanism used to encode and decode communications. Each frame 303 carries a time-sliced portion of all of the communications on a particular conduit. Frames from different conduits 208 may or may not be aligned in time and embodiments are applicable to FDMA/JDMA communication protocols with either aligned or unaligned conduits 208. Each frame 303 is divided into two or more sub-frames that appear in the same relative position in each frame and each carry a time-sliced portion of a circuit. Thus, a circuit exists over several or many frames, depending upon the duration of the communication. The number of simultaneous communication sessions that can be supported depends upon the number of sub-frames per frame. In the present example, frame 304 is divided into three sub-frames 306, 308 and 310 that are associated with three separate circuits. The particular number of sub-frames per frame may vary depending upon the requirements of a particular application and the invention is not limited to frames with any particular number of sub-frames. Moreover, the invention is applicable to applications where the number of circuits per frame varies from frame to frame. For purposes of explanation only, each frame 303 is divided into three subframes.

Each sub-frame 306, 308 and 310 is divided into two or more portions referred to herein as "slots" that carry signaling information and communication data. The size of each slot depends upon the amount of information that each slot is required to carry and the amount of quiet time each slot requires to prevent overlapping (interfering) with other slots. The number of slots determines the maximum number of mobile stations that can simultaneously transmit data in a particular communication session. According to one embodiment, each sub-frame 306, 308, 310 is allocated (M+3) slots, where M is the desired maximum number of mobile stations to simultaneously participate, i.e. transmits data, in a single communication session, providing "M duplex" capability.

In the present example, each circuit 306, 308 and 310 is divided into seven slots 312. Slots 312 include three signal information slots for carrying signaling information to manage communications and four communication data slots for carrying communication data. As a result, a maximum of four mobile stations can simultaneously transmit data in each communication session. As is described in more detail hereinafter, there can be many more passive participants that are not transmitting data but are only "listening" and therefore do not require slots.

The data carried on each slot 312 can vary over time. Thus, slots 312 are not dedicated to a particular function. According to one embodiment, the signal information slots include a broadcast channel (BCCH) slot 314, a dedicated control channel (DCCH) slot 316 and a random access channel (RACH) slot 318. BCCH slot 314 is used t o provide synchronization for a communication session and to designate the communication data slot assignments to the participating mobile stations. BCCH Slot 314 may also be used for synchronizing other circuits in the conduit and, in frequency-hopping applications, other conduits. DCCH slot 316 is used to carry control signaling for mobile stations. RACH slot 318 is used for a variety of purposes including establishing and maintaining communication links. The use of the BCCH slot 314, the DCCH slot 316 and the RACH slot 318 is described in more detail hereinafter. According to one embodiment, the four communication data slots are identified as traffic associated control channel (TCH) slots 320, 322, 324 and 326 that are provided for carrying communication session data. The relative position of individual slots within slots 312 is not limited to a particular configuration and may change over time, even during a communication. Certain slot ordering may enhance performance, for example by placing BCCH slot 314 as the first slot to enhance synchronization. The invention however, is not limited to a particular slot ordering, or eve n to having all slots appear in each sub-frame 306, 308 and 310. For example, DCCH slot 316 could be multiplexed with RACH slot 318 onto a single slot so that each slot occurred every other frame.

An example implementation of the aforementioned architecture is now described in more detail. A (20) MHz RF band 200 could carry ten conduits 208, spaced approximately 1.718 MHz center to center (the remaining 282 KHz would be used for RF guard bands). Each conduit 208 would have a capacity of 1,152 K bits/second. Further assuming a frame size of (20) ms, a required slot capacity of (176) bits and allowing 0.1 ms for intra-slot guard times and training, each frame would have a capacity of (79) slots. Assuming a maximum of three active users per communication session and 3 slots for overhead (BCCH, DCCH, RACH), then a frame could be divided into (13) sub-frames of 6 slots each utilizing a total of (78) slots. The extra slot time (approximately 250 micro seconds) could be apportioned to intra-slot guard time. Thus the system could support (13) channels per conduit for a total of (130) possible communication sessions within an area only slightly larger in radius than the range of the mobile station's radio.

The parameters actually used in an embodiment will depend upon many factors including, but not limited to:

the RF Band in which the mobile stations operate and the requirements imposed by the FCC for operation within the band the operating characteristics of the mobile stations (e.g., their filtering, sensitivity, timing, etc.)

the operating characteristics of the mobile stations (e.g., their processing power, etc.)

the VOCODER algorithm chosen (data requirements, sampling rate, etc.)

design criteria (e.g., number of simultaneously active users supported, etc.)

The approach for providing wireless communications is now described in more detail in the following sections: (1) establishing a communication session; (2) maintaining a communication session; (3) adding mobile stations; (4) dropping mobile stations; (5) sleep intervals; (6) private communication sessions; (7) power control; and (8) quality measurements and error recovery.

1. Establishing a Communication Session

The first step in providing wireless communications involves establishing a communication session involving two or more mobile stations that wish to communicate with each other. In general, according to an embodiment, a first mobile station attempts to establish a communication session with a second mobile station by 1) looking for the second mobile station in active circuits and by 2) attempting to attract the attention of the second mobile station by "paging" the second mobile station. As used herein, the term "paging" refers to sending a communication signal to a particular mobile station to attract the attention of the particular mobile station.

For each communication between two or more participating mobile stations, one of the participating mobile stations takes on the role of a pseudo base station (PBS) and the other participating mobile stations are referred to herein as terminating mobile stations (TMSs). A PBS provides frame synchronization, authenticates other participants, i.e., TMSs, assigns slots to active TMSs and performs a variety of other management functions as described hereinafter. Generally, a mobile station that first initiates a communication session is the PBS for that communication session, although any participating mobile station may be a PBS and the role of PBS may be transferred between mobile stations during a communication session. For example, during a particular communication session between three or more mobile stations, the PBS for the particular communication session may drop out of the communication session, for example, if the PBS voluntarily ends its participation in the particular communication session, or if the PBS moves out of range of the other participants. In this situation, one of the remaining (TMSs) takes on the role of the PBS.

A. Locating A Mobile Station

In general, mobile stations locate other mobile stations by examining circuits. PBSs examine circuits to locate and determine the state of other mobile stations. TMSs examine circuits to determine whether they are being paged by another mobile station. According to one embodiment, examining circuits includes determining the suitability of circuits based upon whether the circuits are noisy, active or idle. A noisy circuit is a circuit having an amount of noise that exceeds a specified noise threshold. An active circuit is a circuit that is both not noisy and is currently in use by at least one mobile station. An idle circuit is a circuit which is neither noisy nor active.

Referring to FIGS. 1 and 3, assume mobile station 102 wishes to communicate with mobile station 104. For purposes of this example, mobile station 102 is the PBS and mobile station 104 is a TMS. In general, PBS 102 exhaustively examines all available circuits in all available conduits to locate and determine the state of TMS 104. According to one embodiment, PBS 102 examines the BCCH slot of sub-frames 306, 308 and 310 looking for the MSID of TMS 104 to determine whether TMS 104 is currently participating in a communication session. Otherwise PBS 102 transmits a page on the RACH slot of each active circuit. PBS 102 will then receive a message from the PBS controlling the circuit confirming whether or not TMS 104 is a participant on that circuit. In the present example, it is presumed that TMS 104 is in an idle state, i.e., not participating in any of the examined circuits, and is currently able to detect and acknowledge a page. Establishing a communication session with TMS 104 when TMS 104 is in another state is described in more detail hereinafter.

Once it has been determined that TMS 104 is not participating in an active communication session, PBS 102 identifies an idle circuit on which to place a page to TMS 104. Pages are not placed on noisy or active circuits, even though noisy circuits may become available for future pages since noise can be transient. According to one embodiment, PBS 102 maintains a history of the noise characteristics of circuits to aid in the selection of circuits in the future. This is based on the presumption that a relatively "quieter" conduit is generally preferable to a relatively noisier conduit.

Assume for the purposes of this example, that PBS 102 identifies circuit 306 as idle and therefore available for transmitting a page to TMS 104. PBS 102 pages TMS 104 by placing a mobile station identifier (MSID) for TMS 104 on the BCCH slot 314 of circuit 306. An MSID is an identifier that uniquely identifies a mobile station. An example of a MSID is a conventional telephone number. The MSID sent by PBS 102 to TMS 104 serves as an invitation for TMS 104 to communicate with PBS 102 on circuit 306. PBS 102 also places its MSID on BCCH slot 314 of circuit 306 so that TMS 104 will know that PBS 102 initiated the page. After paging TMS 104, PBS 102 begins looking for an acknowledge to its page in the RACH slot 318 of circuit 306.

B. Detecting and Acknowledging a Page

In general, a TMS searches for a page by exhaustively searching all available circuits on all available conduits until either the TMS finds a page or until a specified amount of time has elapsed. In the present example, assuming that TMS 104 is available to communicate with PBS 102, TMS 104 examines the BCCH slot of sub-frames 306, 308 and 310 looking for its own MSID. (Note that TMS 104 might be able to communicate with PBS 102 even if TMS 104 were active on another communication session.) In this situation, TMS 104 could either drop off and establish a new communication session with PBS 102 or invite PBS 102 to join the communication session in which TMS 104 is active. When TMS 104 finds its MSID in the BCCH slot 314 of sub-frame 306, TMS 104 knows that another mobile station is attempting to establish communications with TMS 104. TMS 104 acknowledges the page by placing an acknowledge signal on the RACH slot 318 of sub-frame 306. TMS 104 knows that PBS 102 initiated the page and is waiting for an acknowledge since the PBSID for PBS 102 is present in the BCCH slot 314 of sub-frame 306.

Meanwhile, PBS 102 is searching for an acknowledge to its page to TMS 104 by periodically examining the RACH slot 318 of sub-frame 306. Once PBS 102 find an acknowledge signal in the RACH slot 318 of sub-frame 306 from TMS 104, PBS 102 knows that TMS 104 is ready to communicate with PBS 102. PBS 102 then establishes a communication session between itself and TMS 104 by performing several steps. First, PBS 102 assigns an available TCH slot 320, 322, 324 or 326 from sub-frame 306 to itself for carrying communication data to TMS 104. PBS 102 may alternatively use the BCCH slot 314 or DCCH slot 316 for transmitting data to TMS 104. PBS 102 also assigns an available TCH slot 320, 322, 324, 326 or the DCCH slot 316 to TMS 104 for carrying communication data from TMS 104 to PBS 102. Assigning separate slots to PBS 102 and TMS 104 allows PBS 102 and TMS 104 to transmit data to each other simultaneously. According to one embodiment, PBS 102 assigns the last TCH slot 326 to one of the participating mobile stations (including itself) to increase the likelihood that another mobile station examining sub-frame 306 will detect that the circuit associated with sub-frame 306 is in use. Slot assignments may change on a frame-by-frame basis as determined by PBS 102 based upon which participating mobile stations need to transmit data and which type of data those mobile stations need to transmit. Once slots have been assigned to PBS 102 and TMS 104, PBS 102 transmits a communication ready signal to TMS 104 and BCCH slot 314 to indicate to TMS 104 that the communication session has been established and communications may commence on the assigned slot. TMS 104 may alternatively infer that a communication session has been established once TMS 104 has been assigned a slot 312. According to another embodiment of the invention, PBS 102 uses BCCH slot 314 to transmit data to TMS 104 instead of an available TCH slot 320, 322, 324 or 326.

In some situations, MSIDs can be quite large and passing large MSIDs between mobile stations can consume a large amount of slot space. Therefore, according to one embodiment of the invention, once a particular mobile station has joined a particular communication session, the PBS for the particular communication session assigns a shorter mobile station ID, referred to herein as a "nick-name ID" or NNID, to the particular mobile station. The NNID is shorter than an MSID and therefore requires less slot space.

In some types of communication sessions, additional negotiation between PBS 102 and TMS 104 may occur before communications actually commence. For example, in the context of voice communications, a caller usually hears a ring in the headset earpiece, while the person being called usually hears an audible ringing to get their attention. Therefore, according to an embodiment, the communication ready signal initiates visual and/or audible signals, e.g. "ringing," on both PBS 102 and TMS 104 to indicate that the communication session between PBS 102 and TMS 104 is established and ready for use. A user associated with TMS 104 may then either respond to the visual and/or audible signal to participate in the communication session, or choose not to participate in the communication session by ignoring the visual and/or audible signal.

According to one embodiment, slot assignments are maintained in a slot map that is provided to all participating mobile stations (in this example PBS 102 and TMS 104) on BCCH slot 314 in each frame 303. Participating mobile stations use the slot map to know where to look for signal information and communication data from other mobile stations. Once PBS 102 has initiated paging of TMS 104, subsequent communication sessions may be synchronized in time in conduit 302 with respect to the paging occurring in the first communication session.

According to one embodiment, the relative position of RACH slot 318 within circuit 306 is determined by PBS 102. In situations as described in which TMS 104 is using RACH slot 318 for acknowledging a page from PBS 102, the determination of the position of RACH slot 318 is based upon: (1) the amount of time that is required for TMS 104 to recognize its MSID in the BCCH slot 314 before it can acknowledge the page; and (2) TMS 104 may not have yet been synchronized into the communication session and may require extra guard time to be synchronized.

In some situations, a page may not be detected by a mobile station, for example because of interference, because the mobile station is out-of-range of the PBS transmitting the page, or simply because the mobile station is not looking at the circuit at the time the page is transmitted. Therefore, according to one embodiment, if PBS 102 has not received a response to a page of TMS 104 within a specified period of time, PBS 102 re-transmits the page to TMS 104 on a different available circuit. If PBS 102 has not received a response from TMS 104 to any of the transmitted pages, then PBS 102 assumes that TMS 104 is not accessible and paging is discontinued. In this situation, a communication session cannot be established at the present time.

The aforementioned sequence illustrates the basic steps required to establish a communication session between PBS 102 and TMS 104 when TMS 104 is available to detect and acknowledge a page. However, TMS 104 may be in a state where TMS 104 is not able to detect and acknowledge a page from PBS 102. According to one embodiment, TMS 104 can be in five different states at the time TMS 104 is paged by PBS 102. Note that PBS 102 may not be able to determine the exact state of TMS 104.

The states are: (i) idle; (ii) participating in a communication session; (iii) paging; (iv) setup or release; or (v) powered off or out-of-range, each of which is described in more detail hereinafter.

i. Idle

In the idle state, TMS 104 is looking for a page by examining t he BCCH slot of circuits 306, 308 and 310 and a communication session is established between PBS 102 and TMS 104 as previously described.

ii. Participating in a Communication Session

While examining sub-frames 306,308 and 310, PBS 102 may determine that TMS 104 is participating in another communication session at the time PBS 102 decides to page TMS 104 based upon the presence of the TMS 104 MSID in the BCCH slot of sub-frames 306, 308 or 310. For example, TMS 104 may currently be paging another mobile stat ion or may be a PBS for another communication session. According to another embodiment, PBS 102 queries the PBS of other communication sessions to determine whether TMS 104 is participating in a communication session. A mobile station participating in a communication session may be referred to herein as either "active" or "passive." An active mobile station is currently transmitting information and is assigned a particular slot on a circuit. A passive mobile station is not currently transmitting information and is not assigned a slot, but may be listening. Passive participating mobile stations that wish to transmit information request a slot from the PBS. Active mobile stations give up their assigned slot when they stop transmitting information and become passive.

If TMS 104 is participating in a communication session, then PBS 102 may either: (1) abort the attempt to establish a communication session with TMS 104 now and try again later, or (2) proceed to page TMS 104 knowing that the communication session may not be established with TMS 104. To abort the attempt, PBS 102 simply stops paging TMS 104 and may try again later. Alternatively, PBS 102 may page TMS 104 on the RACH slot 318 of the circuit in which TMS 104 is currently participating. Upon detecting the page, TMS 104 may: (1) ignore the page from PBS 102 or acknowledge the page with a "page refused" message and continue with its current communication session, (2) acknowledge the page from PBS 102 and allow PBS 102 to join the other communication session, or (3) acknowledge the page and discontinue its participation in the other communication session. Note that for (ii), TMS 104 would negotiate with the controlling PBS, that would acknowledge the page on behalf of TMS 104 and either invite PBS 102 to join the communication session or inform PBS 102 that TMS 104 will discontinue the current communication session and establish a separate communication session with PBS 102. There may be user interaction involved in this decision.

iii. Paging

TMS 104 may also be paging when PBS 102 wants to page TMS 104. TMS 104 may be paging either PBS 102 or another mobile station. PBS 102 examines the BCCH slots of sub-frames 306, 308 and 310 looking for its own PBSID to determine if TMS 104 is paging PBS 102. If TMS 104 is paging PBS 102, then PBS 102 acknowledges the page as described herein and their roles switch, i.e., they would become PBS 104 and TMS 102. If TMS 104 is paging another mobile station, then two different actions may be taken depending upon the requirements of a particular application. First, PBS 102 may delay paging TMS 104 until a later time and try again. For example, PBS 102 may wait a specified period of time and then try paging TMS 104 again.

Instead of waiting to page until later, PBS 102 may proceed to immediately page TMS 104 by placing the page on the RACH slot 318 of the circuit that TMS 104 is using to page. Upon detecting the page from PBS 102, TMS 104 may either abort its page to the other mobile station and respond to the page from PBS 102, or TMS 104 may ignore the page from PBS 102 and continue with its page to the other mobile station, or both. The determination of which action TMS 104 takes may be left up to a user. For example, TMS 104 may indicate to the user that TMS 104 is being paged by PBS 102 and allow the user to decide whether to abort the page to the other mobile station and respond to the page from PBS 102, to ignore the page from PBS 102 and continue paging the other mobile station, or to accept the page from PBS 102 and continue paging for the other mobile station. According to one embodiment, the two mobile stations acknowledge the communication attempt with a "standby message" and maintain contact while waiting for a user decision.

iv. Setup or Release

TMS 104 may be involved in setting up or releasing another communication session. In this situation, TMS 104 is not immediately accessible. Using the paging approach described herein, PBS 102 will locate TMS 104 before TMS 104 transitions into an inaccessible state or after TMS 104 has transitioned out of the inaccessible state.

v. Powered Off or Out-Of-Range

TMS 104 may be powered off or out-of-range of PBS 102. In either of these situations, PBS 102 cannot currently establish a communication session with TMS 104.

C. Other Paging Considerations

During the paging process, it is possible that while PBS 102 is examining circuits looking for TMS 104, PBS 102 may find its own MSID in the BCCH slot of sub-frames 306, 308 or 310 indicating that PBS 102 is being paged by a mobile station other than TMS 104. In this situation, either the page to TMS 104 may be terminated and PBS 102 may respond to the page from the other mobile station, or PBS 102 may ignore the page from the other mobile station and continue with the paging of TMS 104. The determination of which action to take in this situation may be specified by the configuration of PBS 102 or may be determined by a user. During the paging of TMS 104, PBS 102 may visually indicate to a user, for example by displaying an icon on a user interface of PBS 102, that PBS 102 is being paged by another mobile station.

Paging has primarily been described herein in the context of a PBS transmitting a page on a slot of each available circuit to attract the attention of another mobile station. According to another embodiment of the invention, paging is performed on a specified circuit instead of all available circuits. That is, when a PBS places pages on the specified circuit and TMSs only need to examine the specified circuit for a page. This provides the benefit of limiting the number of circuits on which a PBS must broadcast a page, as well as limiting the number of circuits that TMSs must examine to detect a page. In the event that the quality of the specified circuit is no longer suitable for paging, another specified circuit may be selected, e.g., by a PBS or according to a predetermined methodology.

D. Paging In Frequency Hopping Applications

Embodiments are applicable to frequency hopping applications. In frequency hopping applications, conduits periodically change frequency, taking their circuits and communications with them. Two reasons why frequency hopping may be used are that the particular frequency band requires it and it is needed to reduce interference. If frequency hopping is used, then participating mobile stations must support the particular frequency hopping mechanism used. For example, in a frequency hopping application, a participating mobile station must know the number of frequencies hopped and the value and period (dwell time) of each frequency in the hopping pattern. According to one embodiment, information that is required by participating mobile stations to perform frequency hopping is provided by the PBS 102 on BCCH slot 314.

The prior paging methodology described herein has been described in the context of a non-frequency hopping application. For frequency hopping applications, in general, PBS 102 pages while hopping so that the page is effectively present on all hopped frequencies to ensure that all hopped frequencies are covered during a time when TMS 104 is looking for a page. TMS 104 periodically examines a single circuit instead of examining all circuits, since a page will eventually hop onto the circuit being examined by TMS 104. For frequency hopping applications where the frequency hopping intervals are relatively long, e.g., 30 seconds, paging would be accomplished in the same manner as described herein for non-frequency hopping applications.

Figures 4, 4B:
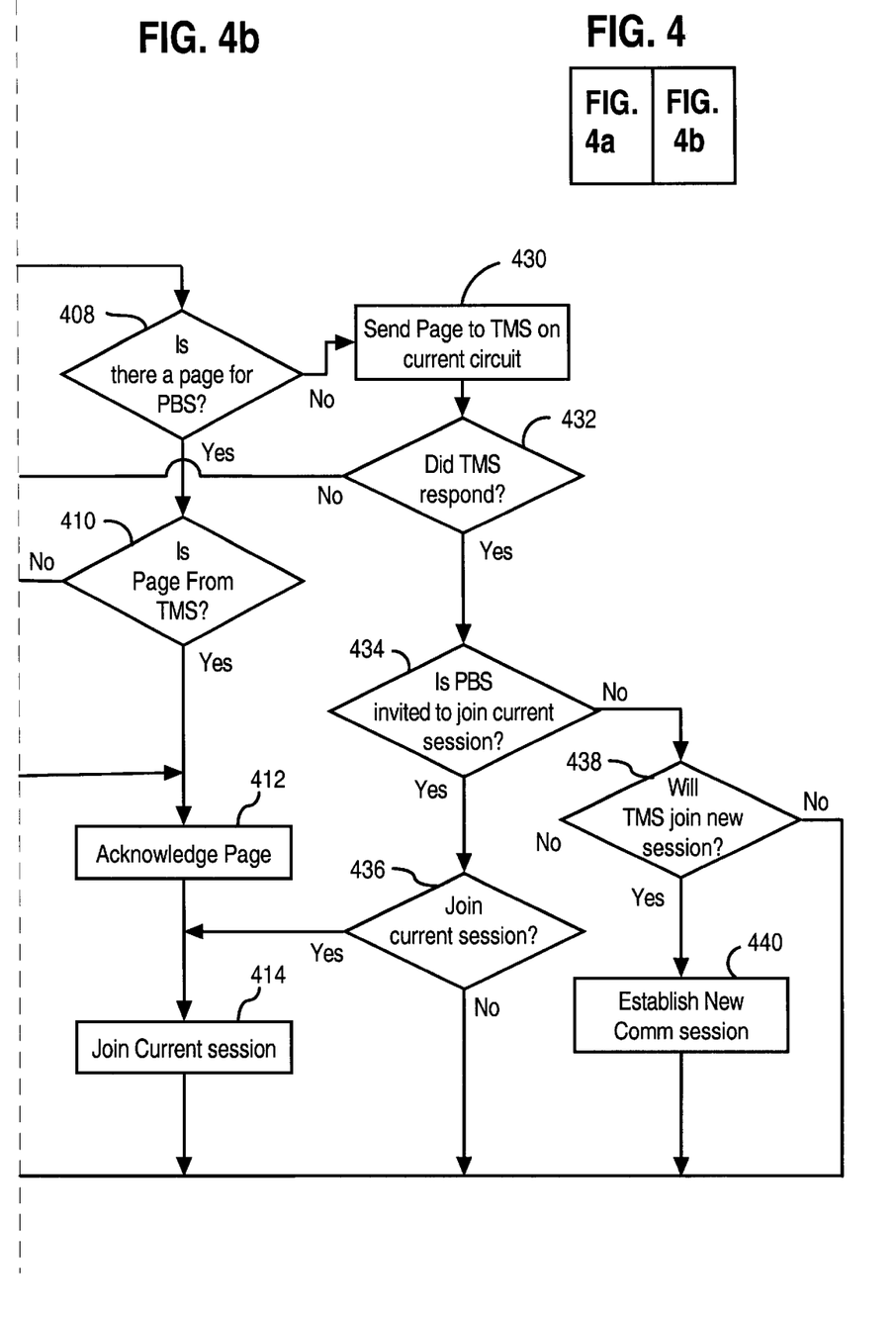
FIG. 4 is a flow chart illustrating an approach for establishing a wireless communication link.
Figure 4A:
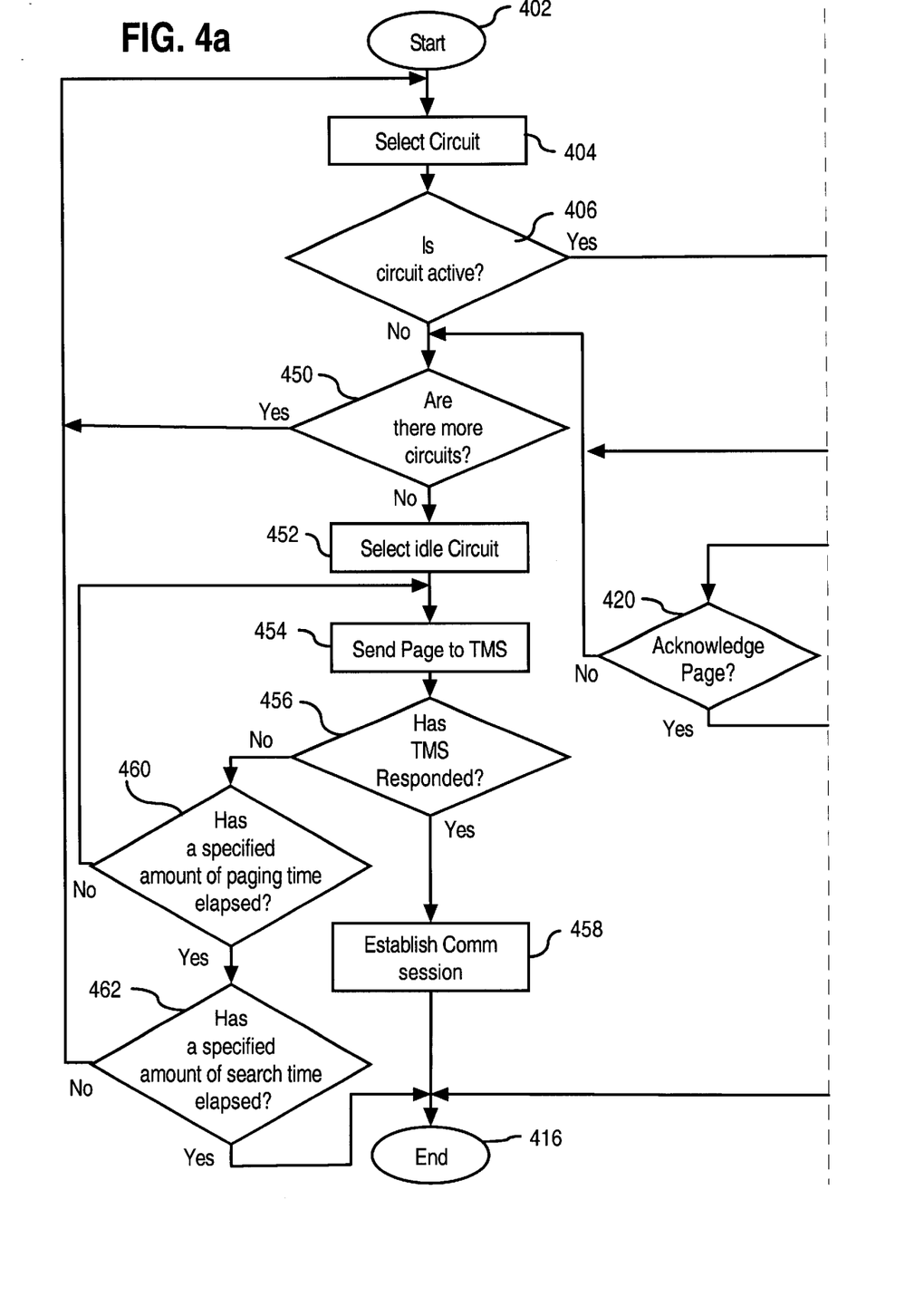

The approach for providing wireless communications according to an embodiment is now described with reference to a flow chart 400 of FIG. 4. After starting in step 402, in step 404, PBS 102 selects a circuit (e.g., 306). In step 406, PBS 102 examines the selected circuit to determine whether it is in use.

If in step 406 it is determined that the selected circuit is active, then in step 408, a determination is made whether there is a page for PBS 102 on the circuit. If there is, then in step 410, a determination is made whether the page is from TMS 104. If it is, then in step 412, PBS 1102 acknowledges the page and in step 414 joins the current communication session and the process in complete in step 416.

If in step 408 it was determined that PBS 102 is not being paged on the selected circuit, then in step 430 PBS 102 sends a page for TMS 104 on the circuit, and in step 432 determines if TMS 104 is participating on the selected circuit. If TMS 104 is participating, then in step 434 PBS 102 determines whether it is invited to join the current communication session. If so, then in step 436 PBS 102 determines if it will join the current communication session (this choice may be determined by application requirements or by user input). If so, then is step 414 PBS 102 joins the current communication session and the process is complete in step 416.

If in step 436 the determination was made that PBS 102 would not join the current communication session, then in step 416 the process is complete. (Essentially, PBS 102 has located TMS 104 and determined that there are no circumstances under which a communication session can be established.)

If in step 434 the determination was made that PBS 102 was not invited to join the current communication session, then in step 438 PBS 102 determines whether TMS 104 will abandon the current communication session and establish a new communication session with PBS 102. If so, then in step 440, PBS 102 and TMS 104 establish a communication session on an idle channel and in step 416 the process is complete.

If in step 438 it was determined that TMS 104 would not abandon the current communication session, then the process is complete in step 416. (Essentially, PBS 102 has located TMS 104 and determined that there are no circumstances under which a communication session can be established.)

If in step 432 a determination was made that TMS 104 was not participating on the selected circuit, then in step 450 a determination is made whether there are more circuits to examine. If so, then in step 404 the process repeats with the selection of another circuit.

If in step 410 it was determined that the mobile station paging PBS 102 was not TMS 104, then in step 420 a determination is made whether PBS 102 will acknowledge the page even though it is not from TMS 104. If so, the process continues in step 412 with the page being acknowledged.

If in step 420 the determination was made to ignore the page, then the process continues in step 450 with a determination whether there are more circuits to evaluate.

If in 450, the determination is made that all circuits have been evaluated, then in step 452 PBS 102 selects an idle circuit and in step 454 broadcasts a page for TMS 104. Note that broadcasting a page is not a single event. Rather, the page is repeated until sufficient time has elapsed to ensure that TMS 104 has had an opportunity to detect the page. In step 456 a determination is made whether TMS 104 has responded to the page. If so, then in step 458 a communication session is established and the process completes in step 416.

If in step 456, it was determined that TMS 104 had not responded to the page, then in step 460 a determination is made whether the paging process has exceeded a specified amount of time. If so, then in step 462 a determination is made whether the entire search process has exceeded a specified amount of time. If so, then the process completes (without finding TMS 104) in step 416.

If in step 460 it was determined that the specified amount of paging time has not elapsed, then the process resumes in step 454 with a page to TMS 104.

If in step 462 it was determined that the specified amount of search time has not elapsed, then the process restarts in step 404 with the initial selection of a circuit to examine.

2. Maintaining a Communication Session

In general, a communication session is maintained on the same circuit for the duration of the communication session. In frequency hopping applications, all participating mobile stations must hop at the same time to maintain a communication session. Furthermore, the frequency hopping periods for different communication sessions within range of each other must be synchronized to avoid overlap. According to one embodiment, the PBSs for the communication sessions within range of each other synchronize the frequency hopping periods.

In some situations the noise and/or interference on a particular circuit may threaten to significantly degrade the quality of communications on the particular circuit. According to one embodiment, if a PBS determines that the noise level and/or interference on a particular circuit has reached an unacceptable level, then the PBS locates an alternative circuit that has a lower noise and/or interference level and moves the communication sessions on the particular circuit to the alternative circuit. To accomplish this, the PBS informs each of the participating mobile stations that the communication session is being moved to the alternative circuit and then transfers the contents of the signal information slots to the alternative circuit. This process is similar to a single hop in a frequency hopping application.

3. Adding Mobile Stations

In general, there are two situation in which a mobile station may be added to a communication. A participating mobile station may request that another mobile station join a communication or another mobile station may ask a participating mobile station to join a communication. Both situations are accomplished using paging as previously described.

4. Dropping Mobile Stations

In general, there are two situations in which a mobile station may be dropped from a communication. First, a particular participating mobile station may voluntarily request to be dropped from a communication because the particular mobile station no longer wishes to participate in the communication. According to one embodiment, a particular mobile station that no longer wishes to participate in a communication sends a drop request to the PBS managing the communication. The managing PBS acknowledges the drop request and removes the particular mobile station from the communication by updating the slot map.

The second situation in which a mobile station is dropped from a communication occurs involuntarily when a particular participating mobile station loses a particular communication link for a specified period of time. This may occur for several reasons, for example if the particular participating mobile station moves out of range, or if the particular participating mobile station experiences a high level of interference.

5. Sleep Intervals

Power conservation is an important issue in mobile wireless communication systems since mobile stations are typically powered by batteries, providing limited communication time. One approach for conserving power is for mobile stations to operate in a sleep mode for a specified period of time. While operating in a sleep mode, a mobile station generally performs only essential functions, such as servicing user interaction and other necessary functions.

According to one embodiment, mobile stations are configured to enter into a sleep mode when specified sleep interval criteria are satisfied. Examples of sleep interval criteria include, but are not limited to, a specified number of circuit checks with no pages and a specified amount of time with no pages. For example, the sleep interval criteria may specify that after a particular mobile station completes three consecutive checks of all circuits in all conduits without detecting a page, then the particular mobile station enters a sleep mode. Alternatively, the sleep interval criteria may specify that after the particular mobile station checks circuits for a specified period of time without detecting a page, the particular mobile station enters a sleep mode. According to one embodiment, mobile station operation during sleep mode includes servicing user interactions and performing various other essential functions. After a specified period of time, mobile stations in sleep mode exit the sleep mode and return to the idle state, where the mobile stations continue searching for pages. The paging approach described herein ensures that a mobile station can be located, if it is powered on and in range, regardless of the mobile station's sleep pattern.

6. Private Communication Sessions

As used herein, a private communication session refers to employing a particular security mechanism with a wireless communication session as described herein to make it more difficult, or impossible, for an eavesdropper to understand communications being carried on the private communication session. According to one embodiment, three levels of privacy are provided by three privacy modes: no privacy mode, normal privacy mode and maximum privacy mode.

In the no privacy mode, data communications are not protected by a security mechanism. Eavesdroppers may listen to communications but cannot participate in a particular communication without joining the particular communication session. The no privacy mode is useful for communicating non-sensitive information, for example for broadcasting announcements.

In the normal privacy mode, a security mechanism is employed to protect data communications. In addition, all new participants to a communication session must be approved by at least one current participant. Thus, in the normal privacy mode, it is possible that some participants may not be aware of certain other participants that they did not approve.

In the maximum privacy mode, a security mechanism is employed to protect data communications. In addition, all new participants to a communication must be approved by all current participants. Thus, in the maximum privacy mode, all current participants are aware of all other current participants.

A variety of security mechanisms may be employed to provide secure communications between participating mobile stations and the invention is not limited to a particular type of security mechanism. An important consideration in deciding upon a particular security mechanism is the amount of processing resources that are required to implement the particular security mechanism.

For example, consider an implementation of the wireless communications approach described herein using conventional public key/private key encryption. Conventional public key/private encryption requires that each participating mobile station generate its own private key and its own public key using its private key. The public keys are made available to all other participating mobile stations. When a particular mobile station wishes to send a secure message to a target mobile station, the particular mobile station encrypts the message using the public key provided by the target mobile station and sends the encrypted message to the target mobile station. When the target mobile station receives the encrypted message, the target mobile station uses its private key to decrypt the encrypted message. Thus, for a communication session involving a large number of mobile stations, each mobile station wishing to transmit a message must generate a large number of messages, separately encrypted for each target mobile station. As a result, convention public key/private key encryption may be impractical for communication sessions involving a large number of mobile stations.

According to one embodiment, a common key encryption approach is employed as the security mechanism. The common key encryption approach generally involves securely distributing a common encryption key, referred to hereinafter as the "Ckey", to all participating mobile stations. The Ckey is used by the participating mobile stations to encrypt data exchanged during a communication session. The Ckey is privately determined by the PBS for a communication session and then separately encrypted and distributed to each participating mobile station using the public key generated by that participating mobile station. Thus, the common key encryption approach is similar to a conventional public key/private key encryption approach for purposes of distributing the Ckey. Once the participating mobile stations have securely received the Ckey, communication data is encrypted and decrypted using the Ckey.

The common key encryption approach is now described in more detail in the context of an example communication session involving four mobile stations, identified as PBS, TMS1, TMS2 and TMS3. At some point in the communication session before secure communications have commenced, mobile stations TMS1, TMS2 and TMS3 each generate a private key, PRIVKEY1, PRIVKEY2 and PRIVKEY3, respectively. Mobile stations TMS1, TMS2 and TMS3 also generate public encryption keys PUBKEY1, PUBKEY2 and PUBKEY3 based upon private keys PRIVKEY1, PRIVKEY2 and PRIVKEY3, respectively. Mobile stations TMS1, TMS2 and TMS3 then send their respective public encryption key PUBKEY1, PUBKEY2 or PUBKEY3 to PBS.

When the PBS is ready to establish privacy, the PBS generates a common encryption key (Ckey) to be used to encrypt communication data exchanged between PBS, TMS1, TMS2 and TMS3. The PBS then generates three encrypted messages MSG1, MSG2 and MSG3 that contain the Ckey and that are used to securely provide the Ckey to mobile stations TMS1, TMS2 and TMS3, respectively. Each encrypted message MSG1, MSG2 and MSG3 is encrypted using the respective public key PUBKEY1, PUBKEY2 or PUBKEY3 from mobile stations TMS1, TMS2 and TMS3. Thus, message MSG1 is encrypted using PUBKEY1, message MSG2 is encrypted using PUBKEY2 and message MSG3 is encrypted using PUBKEY3. The PBS then transmits the encrypted messages MSG1, MSG2 and MSG3 to mobile stations TMS1, TMS2 and TMS3. Mobile stations TMS1, TMS2 and TMS3 then decrypt their respective message using their respective private key PRIVKEY1, PRIVKEY2 or PRIVKEY3 and extract the Ckey.

After extracting the Ckey, each mobile station TMS1, TMS2 and TMS3 send an acknowledge message to the PBS. Once PBS has received an acknowledge from all participating mobile stations TMS1, TMS2 and TMS3, the PBS knows that the mobile stations TMS1, TMS2 and TMS3 have successfully extracted the Ckey. When the PBS determines that secure communications should commence, the PBS notifies the mobile stations TMS1, TMS2 and TMS3 to start using the Ckey to encrypt and decrypt messages.

Portions of communication sessions or entire communication sessions may be protected in this manner. For example, a particular communication session may be initiated in the no privacy mode and later changed to either the normal privacy mode or the maximum privacy mode. In this situation, the PBS requests public keys from each of the participating mobile stations TMS1, TMS2 and TMS3 and proceeds as previously described. When a new mobile station joins a communication session that is currently employing the common key encryption approach, the PBS requests a public key from the new mobile station and the PBS sends the Ckey to the new mobile station in the same manner as described herein with respect to establishing secure communications at the beginning of a communication session.

With the common key encryption approach, all participating TMSs (and any eavesdroppers) may receive the encrypted messages MSG1, MSG2 and MSG3, but only the TMS for whom the message is intended will be able to successfully decrypt the message and extract the CKey. According to one embodiment, the MSID or NNID of the intended recipient mobile station is appended (non-encrypted) to the encrypted messages MSG1, MSG2 and MSG3 so that mobile stations only have to look for a message containing their respective MSID or NNID. Alternatively, the MSID or NNID of the intended mobile stations also be encrypted. In this situation, each mobile station, namely TMS1, TMS2 and TMS3, must decrypt all of the messages MSG1, MSG2 and MSG3. With this approach, only the TMS whose public key was used to encrypt the message could decrypt the message and find its MSID or NNID. The other mobile stations would receive random garbage (which they would know to ignore).

The common key encryption approach may be implemented with any encryption algorithm. Furthermore, more than one Ckey may be used and Ckeys may be changed at any time, even during a communication session.

The common key encryption approach provides several advantages over conventional encryption approaches. The common key encryption approach avoids having to generate separate "versions" of a message for each participating mobile station which can require significantly fewer resources to generate and transmit the data (e.g., fewer slots) than conventional public key/private key encryption approaches. Furthermore, it eliminates the need to know which mobile stations are listening to a communication session and therefore can be used in the normal privacy mode described herein. The common encryption algorithm employed by the participating mobile stations does not have to be a public key algorithm and may be selected depending upon the requirements of a particular application.

7. Power Control

Power control is an important issue in wireless communications because signal strength directly affects battery life and interference with other participants. According to one embodiment, each mobile station is configured to transmit with sufficient power to reach the most distant mobile station participating in the communication. As a result, closer mobile stations must be configured to handle the power level used to communicate with more distance mobile stations. According to one embodiment, mobile stations include per slot automatic gain control to compensate for differences in signal strength between nearby and distant mobile stations.

8. Quality Measurements and Error Recovery

The quality of a communication link is transient and is affected by factors including, but not limited to, the location of mobile stations relative to each other, terrain features and the number of communications that are maintained within range of each other. As a result, there is a need to periodically assess the quality of communication links.

According to one embodiment, PBSs obtain quality information from participating mobile stations on their respective communication links. The quality information may include, for example, the quality of each slot received by the participating mobile station, the best and worst signal strength and an indication of whether the signal strength is increasing, decreasing or remaining constant. According to another embodiment, PBSs obtain error information from participating mobile stations on their respective communication links so that the communication quality can be assessed. The error information may include, for example, the number of slots received, the number of slots received in error and an indication of whether the error rate is increasing, decreasing or remaining constant.

According to one embodiment, active participating mobile stations provide quality and error information on their respective TCH slots. According to one embodiment, passive participating mobile stations are polled for quality and error information on the BCCH slot and the passive participating mobile stations provide the quality and error information to the requesting PBS on the DCCH slot.

Sometimes communication data is lost or corrupted so that it is unusable. For voice communications, small losses of data can usually be corrected by the vocoder without any perceptible loss in voice quality. As used herein, the term "vocoder" refers to a mechanism for digitizing and compressing communication data, in particular voice data, before the data is transmitted. However, in some situations the loss of signal information may not be correctable by a vocoder. Therefore, according to one embodiment, communication data is periodically re-transmitted until an expected acknowledgment is received from the recipient mobile station.

Although embodiments have been primarily described herein in the context of establishing a connection between mobile stations to provide for a voice communications between mobile stations, the invention is not limited to voice communications and may be used to provide for the exchange of any type of information between mobile stations. Examples of other types of information include, but are not limited to, data, facsimile data, image and video data.

Furthermore, although embodiments have been primarily described herein in the context of providing a terrestrial communication link between mobile stations, the invention is not limited to terrestrial applications. Embodiments are applicable to mobile stations located on the ground, at sea, under water, airborne, in space, or any combination thereof.

Implementation Mechanisms

The approach for providing wireless communications described herein may be implemented in a variety of ways and the invention is not limited to any particular implementation. Example implementations include, but are not limited to, a stand-alone handset, similar to a cellular telephone, integrated into a portable computing device, or installed in an automobile or airplane.

Figure 5:
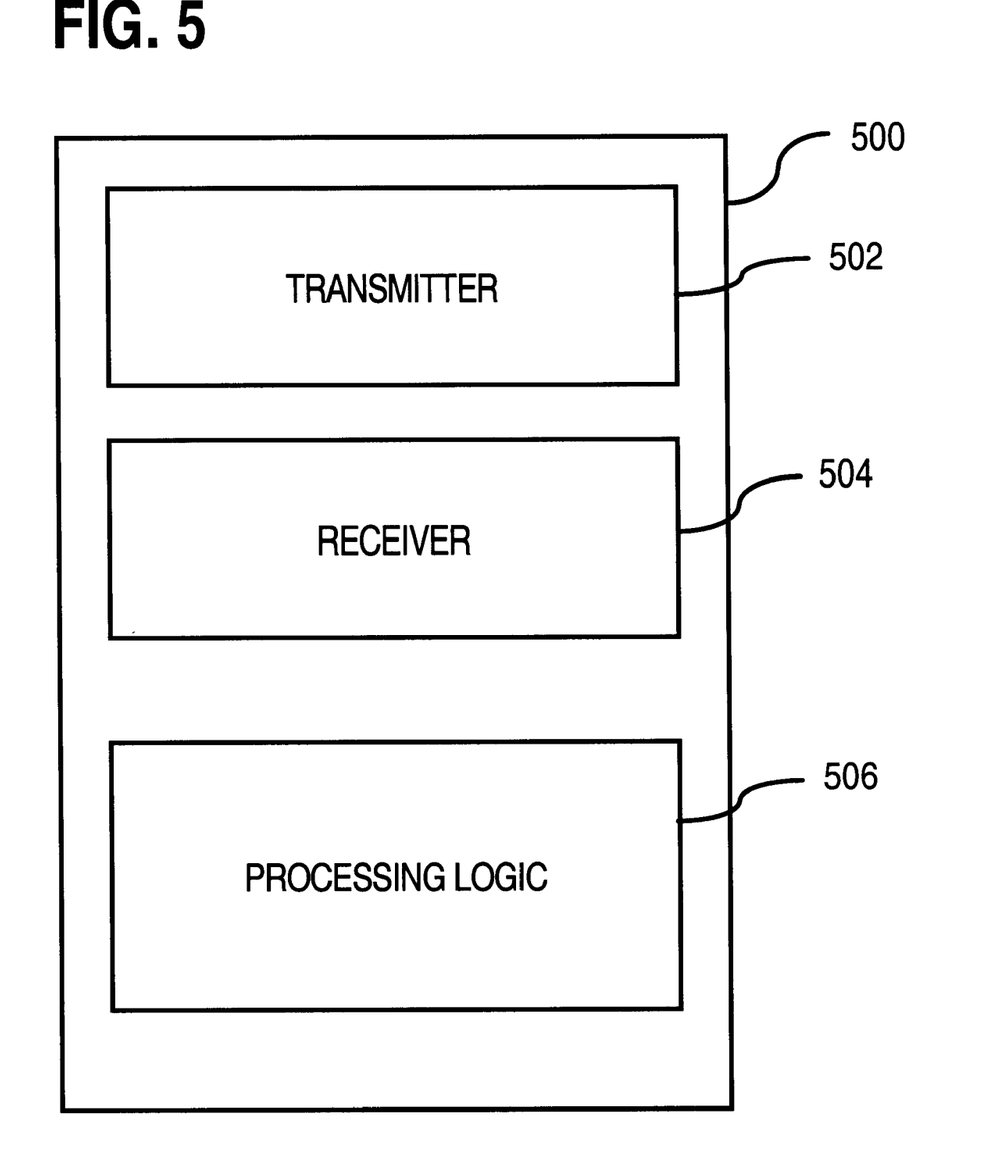
FIG. 5 is a block diagram illustrating a mobile station implementation.

FIG. 5 is a block diagram illustrating a mobile station implemented according to one embodiment. Mobile station 500 includes a transmitter 502, a receiver 504 and processing logic 506. Mobile station 500 may also include other hardware and software components that are not described herein so as to avoid obscuring the features and aspects of the invention.

Transmitter 502 transmits information on circuits as described herein. Receiver 504 receives information from circuits as described herein. Processing logic 506 supports both transmitter 502 and receiver 504 and performs the various communication processing functions described herein. Transmitter 502, receiver 504, processing logic 506 and other elements of mobile station not illustrated may be implemented in hardware circuitry, computer software, or a combination of hardware circuitry and computer software.

Figure 6:
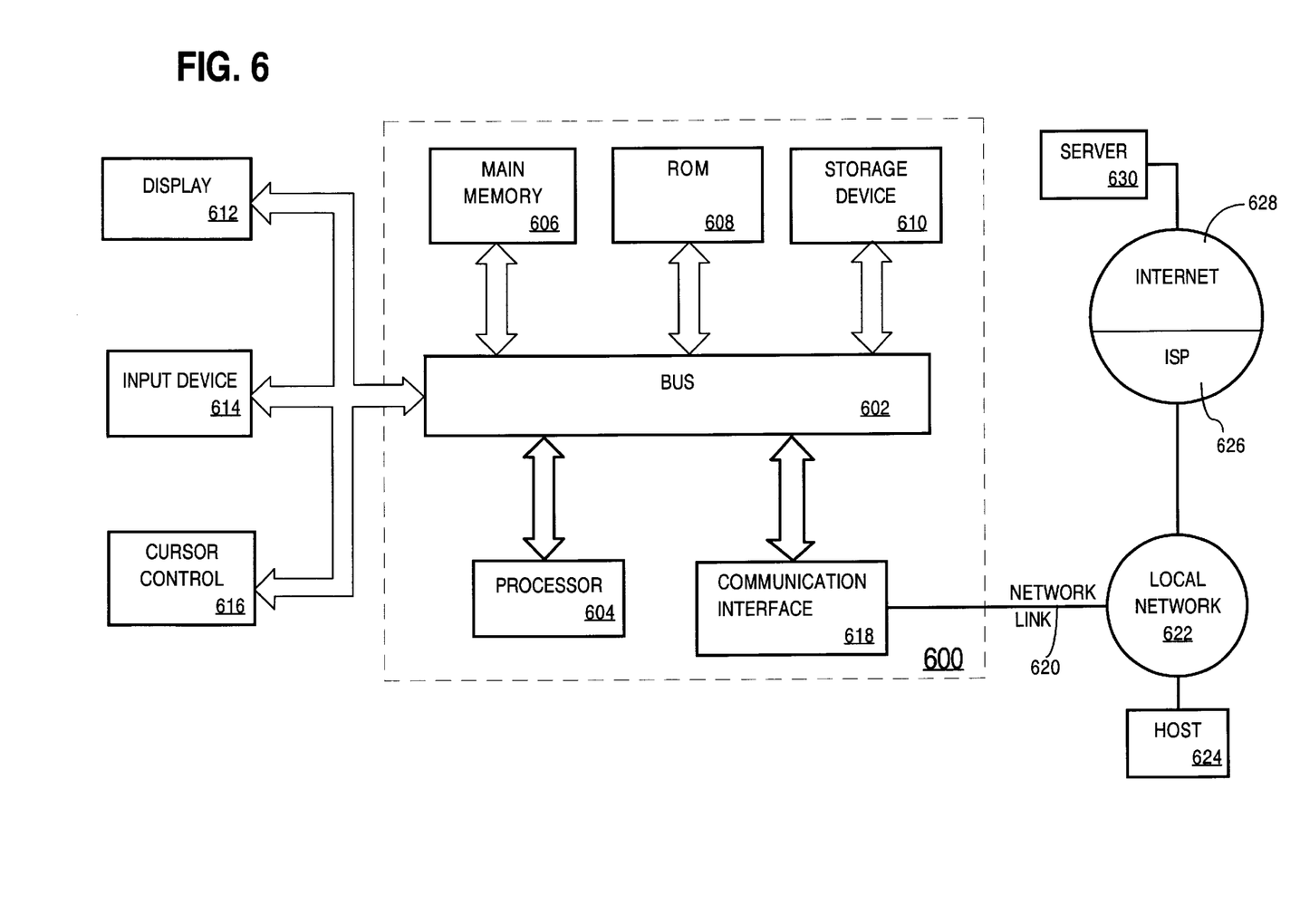
FIG. 6 is a block diagram of a computer system on which embodiments may be implemented.

FIG. 6 is a block diagram that illustrates an example computer system 600 that may be incorporated into any portion of mobile station 500 and used to implement an embodiment. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT) or liquid crystal display (LCD), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for providing wireless communications. According to one embodiment, wireless communications are provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the invention. Thus, embodiments are not limited to any specific combination of hardware circuitry and software.

The term "computer-readable medium" as used herein refers to any medium that participates in providing instructions or data to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes or bumps, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides wireless communications as described herein.

The received code may be executed by processor 604 as it is received, and/or stored in storage device 610, or other non-volatile storage for later execution. In this manner, computer system 600 may obtain application code in the form of a carrier wave.

The approach described herein for providing wireless communications provides several advantages over prior approaches for providing wireless communications. The digital implementation provides several advantages over analog approaches. First, communications are generally less susceptible to background noise and cross-talk than analog approaches. Second, a digital implementation provides a relatively higher level of security than most conventional analog systems. Third, a digital implementation provides additional services such as call waiting, caller ID and third party calling.

The approach is m-duplex, allowing simultaneous bidirectional exchange of information between two or more participants. The free-roaming nature of the approach does not have the geographic limitations or require the expensive and elaborate infrastructure of digital cellular systems. Participants can roam and communicate anywhere, subject only to the range capabilities of the particular devices in which the approach is implemented. Furthermore, any participant can act as a PBS, which makes the approach very flexible. As a result, the approach is particularly useful in remote areas where conventional telephone service and cellular services are not available.

In the foregoing specification, the invention has been described with reference to specific embodiments thereof. However, various modifications and changes may be made thereto without departing from the broader spirit and scope of the invention. The specification and drawings are, accordingly, to be regarded in an illustrative sense rather than a restrictive sense.

What is claimed is:

1. A method for providing communications between mobile stations, the method comprising the steps of:
   selecting a first portion of a radio frequency (RF) band to carry communications between a first mobile station and a second mobile station;
   the first mobile station transmitting a first request signal on a first sub-portion of the first portion of the RF band directly to the second mobile station to request a communication session between the first mobile station and the second mobile station;
   the first mobile station receiving a first acknowledge signal directly from the second mobile station on a second sub-portion of the first portion of the RF band to acknowledge the first request signal; establishing, in response to receiving the first acknowledge signal, a direct communication session between the first mobile station and the second mobile station on the first portion of the RF band;
   the first mobile station receiving from the second mobile station a public encryption key generated using a private encryption key associated with the second mobile station;
   the first mobile station generating a message containing a common encryption key (Ckey);
   the first mobile station encrypting the message using the public encryption key to generate an encrypted message; and
   the first mobile station providing the encrypted message to the second mobile station so that the second mobile station may decrypt the encrypted message using the private encryption key and extract the Ckey;
   wherein, messages exchanged between the first and second mobile stations are encrypted using the Ckey.

2. The method as recited in claim 1, further comprising the steps of
   the first mobile station transmitting a second request signal on the first sub-portion of the first portion of the RF band directly to a third mobile station to request a communication session between the first mobile station, the second mobile station and the third mobile station,
   the first mobile station receiving a second acknowledge signal directly from the third mobile station on the second sub-portion of the first portion of the RF band to acknowledge the second request signal, and
   establishing, in response to receiving the second acknowledge signal, a direct communication session between the first mobile station, the second mobile station and the third mobile station on the first portion of the RF band,
   the first mobile station receiving from the third mobile station a second public encryption key generated using a private encryption key associated with the third mobile station;
   the first mobile station encrypting the unencrypted message using the second public encryption key to generate a second encrypted message;
   the first mobile station providing the second encrypted message to the third mobile station so that the third mobile station may decrypt the encrypted message using the private encryption key and extract the Ckey; and
   wherein, messages exchanged between the first, second and third mobile stations are encrypted using the Ckey.

3. The method as recited in claim 1, further comprising the steps of
   selecting a second portion of the RF band to carry communications between a third mobile station and a fourth mobile station,
   transmitting a second request signal on a first sub-portion of the second portion of the RF band directly to the fourth mobile station to request a second communication session between the third mobile station and the fourth mobile station,
   receiving a second acknowledge signal on a second sub-portion of the second portion of the RF band to acknowledge the second request signal, and
   establishing, in response to receiving the second acknowledge signal, a direct second communication session between the third mobile station and the fourth mobile station on the second portion of the RF band.

4. The method as recited in claim 1, further comprising the steps of communicating using a frequency division multiple access/time division multiple access communication protocol and the first portion of the RF band is a circuit.

5. The method as recited in claim 1, wherein the step of establishing a direct communication session between the first mobile station and the second mobile station data includes
   assigning a third sub-portion of the first portion of the RF band for carrying data from the first mobile station to the second mobile station,
   assigning a fourth sub-portion of the first portion of the RF band for carrying data from the second mobile station to the first mobile station, and
   transmitting a communication ready signal on the first sub-portion of the first portion of the RF band directly to the second mobile station.

6. The method as recited in claim 1, wherein
   the method further comprises the step of examining a plurality of portions of the RF band to identify a set of one or more portions that are available for use, and the step of selecting a first portion of a radio frequency (RF) band includes the first mobile station selecting a first portion from the set of one or more portions that are available for use.

7. A wireless communication system comprising:

a first mobile station; and a second mobile station;

wherein the first mobile station is configured to select a first portion of a radio frequency (RF) band to carry communications between the first mobile station and the second mobile station, transmit a first request signal on a first sub-portion of the first portion of the RF band directly to the second mobile station to request communications between the first mobile station and the second mobile station, the first acknowledge signal on a second sub-portion of the first portion of the RF band directly to the first mobile station to acknowledge the first request signal.

8. A first communications device configured to communicate securely with a second communications device by:

generating a message containing a common encryption key (Ckey);

encrypting the message using a public encryption key associated with the second communications device to generate an encrypted message;

transmitting the encrypted message to the second communications device so that the second communications device may decrypt the encrypted message using a private encryption key used to generate the public encryption key and extract the Ckey; and wherein, one or more other messages exchanged between the first and second communications devices are encrypted using the Ckey.

* * * * *